June 5, 1951  C. C. BORNHOLDT  2,555,569
SAW CARRIAGE AND BRAKE
Filed Sept. 6, 1949  3 Sheets-Sheet 1

Inventor
CHARLES C. BORNHOLDT
By Carlsen + Hagle
Attorneys

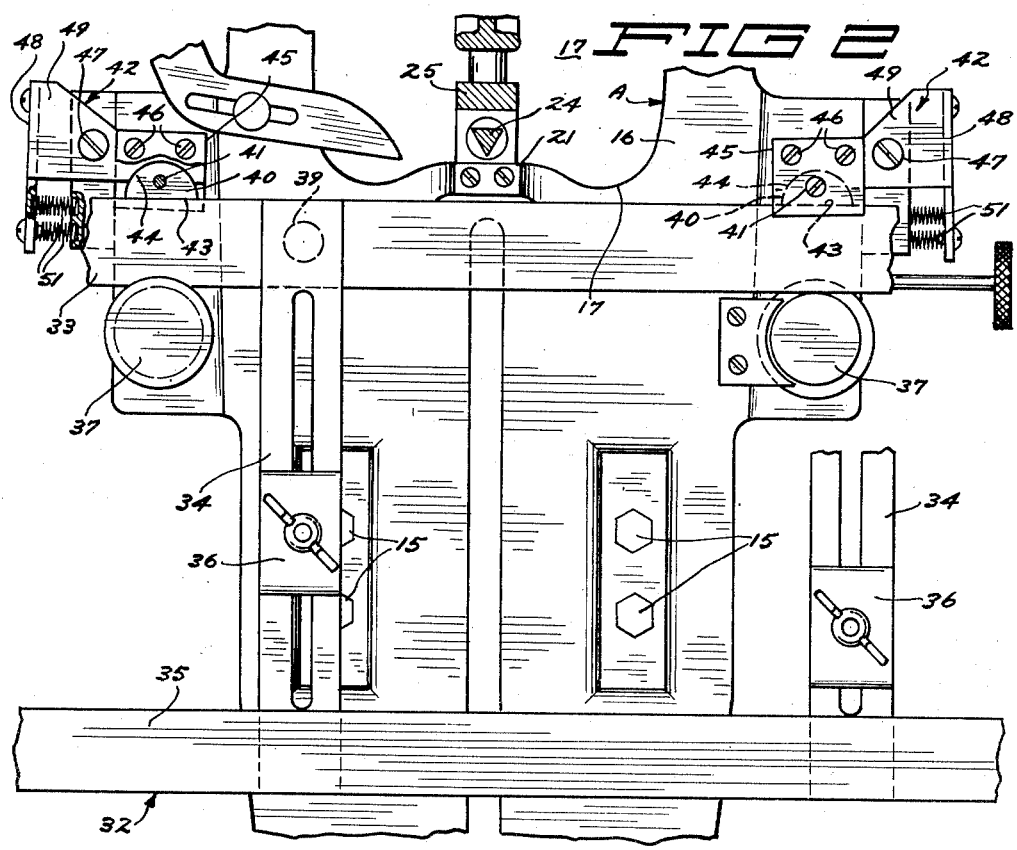
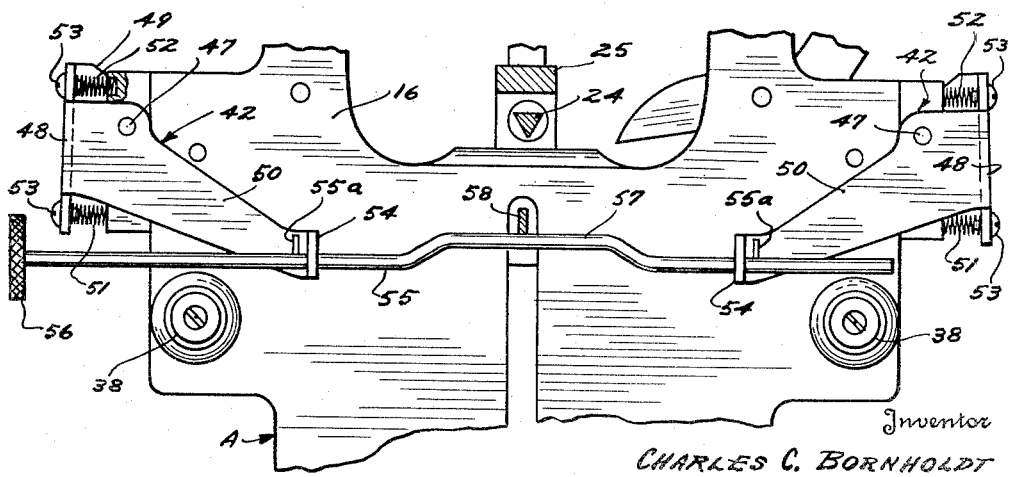

June 5, 1951  C. C. BORNHOLDT  2,555,569
SAW CARRIAGE AND BRAKE
Filed Sept. 6, 1949  3 Sheets-Sheet 3
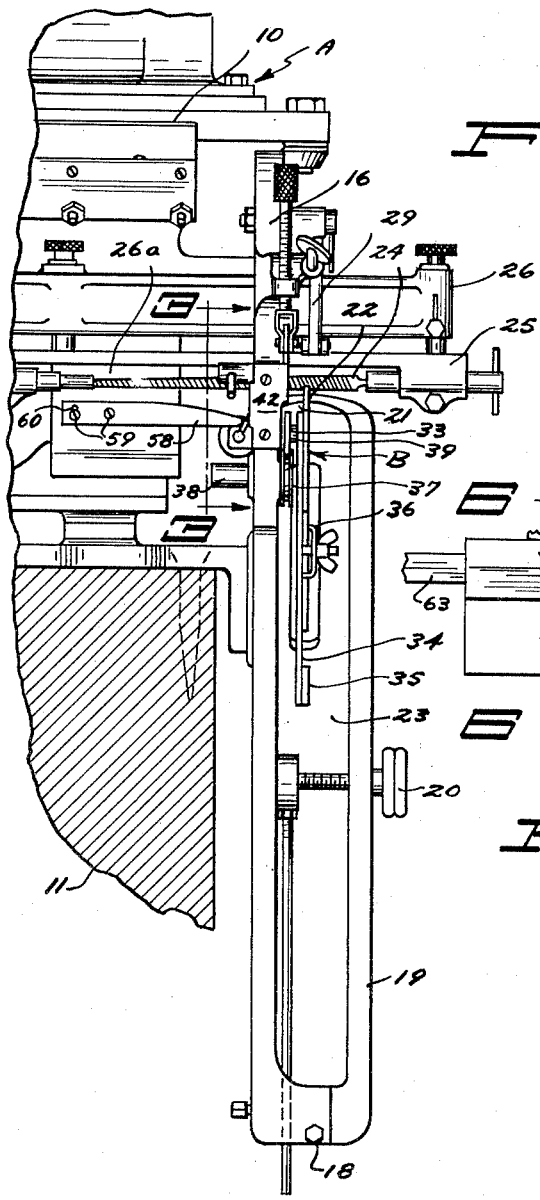
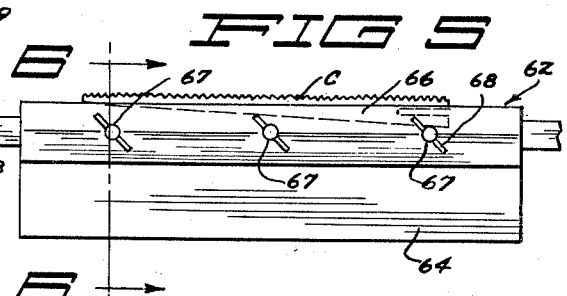
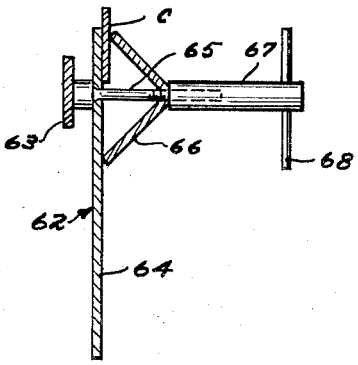
Inventor
CHARLES C. BORNHOLDT
By Carlsen + Hajek
Attorneys Patented June 5, 1951

2,555,569

UNITED STATES PATENT OFFICE 2,555,569

SAW CARRIAGE AND BRAKE

Charles C. Bornholdt, Rochester, Minn.

Application September 6, 1949, Serial No. 114,145

11 Claims. (Cl. 76—35)

This invention relates generally to improvements in automatic machinery for filing hand, back and mitre-box saws and the like, and more particularly to an improved saw carriage and brake means therefor by which the saw is held while being filed.

The primary object of my invention is to provide, for a conventional type of automatic saw filer, a carriage for supporting the saw as it is filed and an automatically actuated brake mechanism for positively holding the carriage and saw against endwise displacement while the file is on its working strokes across the saw. Much difficulty has been experienced in the operation of such machines due to a lack of a positive stop to hold the saw, causing it to move endwise as the file works and forming up the teeth irregularly. Such difficulty is completely eliminated by my present invention, without attention on the part of the operator, so that perfectly filed saws result.

Another object is to provide saw carriage braking means of simple construction which may be readily applied to the saw filer with a minimum of alteration thereof.

A further object is to provide for use with a saw filer with saw carriage brake means of my invention, a simple carriage for accurately and quickly filing key-hole saws and the like which cannot be effectively filed in the present day machines.

These and other more detailed and specific objects will be disclosed in the course of the following specification reference being had to the accompanying drawings, in which—

Fig. 2 is an enlarged front elevational view of the central part of the machine of Fig. 1 with the saw removed and particularly showing the braking action on the carriage.

Fig. 3 is a fragmentary forward looking elevation and section along the line 3—3 in Fig. 4.

Fig. 4 is an end view of the frontal part of the machine, viewed from the left in Fig. 1.

Fig. 5 is a front elevation, on a reduced scale, of a carriage for holding key-hole and similar saw blades for filing.

Fig. 6 is an enlarged vertical sectional view along the line 6—6 in Fig. 5.

Figure 1:
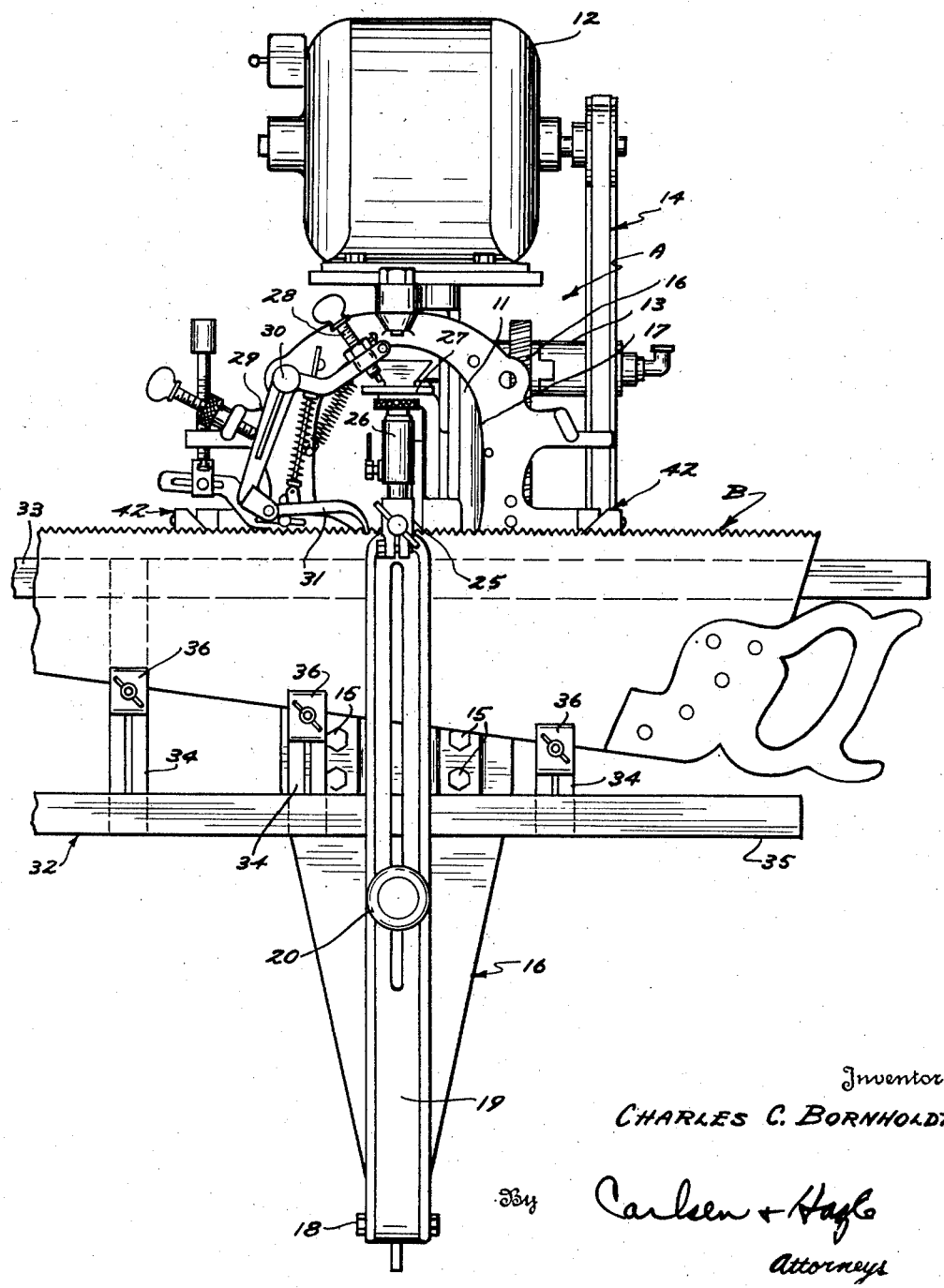
Fig. 1 is a frontal elevation of a conventional saw filing machine with saw carriage and braking means according to my invention.

Referring now more particularly and by reference characters to the drawing, A designates generally an automatic saw filing machine of a commercially available model, for filing the teeth of a conventional hand saw B, or analogous tool. The construction and operation of the filing machine per se will be described herein only so far as necessary to an understanding of my invention.

The filing machine comprises a main frame 10 adapted to be secured to a work bench 11 and having a base whereon is secured an electric motor 12 which drives a main operating shaft 13 through a belt and pulley mechanism 14. Bolted at 15 to the forward edge of the main frame 10 is an irregularly shaped face or front plate 16 having a large work opening 17 through its upper part and a depending vise mounting portion to the lower end of which is pivoted at 18 an upright, elongated vise jaw 19. A hand screw 20 is arranged to pull the jaw 19 toward the face plate so that the upper edge of the saw B will be frictionally held between opposed vise plates or anvils 21—22 (Fig. 4) formed as parts of the face plate and vise jaw respectively. Also as will be noted in Fig. 4 the vise jaw is so offset, or forwardly set that there is a considerable space 23 between the jaw and the face plate to accommodate the saw carriage presently to be described.

The actual sharpening of the saw is done by a conventional triangular or three cornered file 24 carried in a file holder 25 which in turn is adjustably attached to a file carrier frame 26. The frame 26 extends through the work opening 17 in the face plate 16 alongside the main frame 10, and is supported on a frame plate or frame member 26ª. The carrier frame is driven by the motor 12 in such fashion as to reciprocate the file through said opening and across the toothed edge of the saw. The arrangement is further conventionally such that the frame plate 26ª carrying the file carrier frame 26 is also raised and lowered as the file reciprocates, and as the file moves rearwardly (to the left as viewed in Fig. 4) on its working stroke, it travels in engagement with the saw teeth, but as it returns the frame 26 moves upwardly so that the file clears the saw on the back stroke. The file carrier frame has an actuating disk or table 27 operative as the frame rises and travels on its return or back stroke to contact an adjustably mounted rocker arm screw 28 carried by a rocker arm 29 fulcrumed at 30 on the face plate 16 above the saw. A pawl 31 is pivotally attached to the lower end of the rocker arm 29 and is operative, each return stroke of the file carrier frame, to engage the saw teeth and traverse the saw automatically to the next tooth to be filed.

Suitable adjustments are provided for the rocker arm pawl mechanism for accommodating saws having different numbers of teeth per inch, but such elements, being of no materiality to my invention, will not be further described herein.

The saw B is clamped in a carriage or carrier designated generally at 32 having an elongated upper hanger rail 33 from which there depends a series of slotted bars 34 joined at lower ends by a bottom frame bar 35. Thumb screw operated clamps 36 are provided on the bars 34 and may be adjusted up or down in the slots therein so that the clamps may be pulled tight on the lower edge of the saw as clearly shown. The carriage 32 is supported for travel movement across the front of the face plate 16 by rollers 37 journaled on opposite sides thereof. The rail 33 runs at its lower edge over said rollers as best shown in Figs. 2 and 4 and the rollers are journaled in bearings 38 secured to the rear of the face plate so that they are protected from filings. In order to clear the rollers 37 the bars 34 are offset by collars 39 where they are fastened to the rail 33. It is, of course, this travel mount for the carriage 32 that permits the saw to be traversed by the rocker arm and pawl mechanism.

However, difficulty has been experienced in the operation of this type of machine, due to the fact that the saw is not positively locked in place while the file is on its working stroke, the vise anvils 21—22 being not sufficient to prevent slight movement of the saw and carriage. These anvils can only frictionally grip the saw, since it must be free enough to traverse after each tooth is filed as will be understood. In accordance with my invention I provide automatically applied, positive, friction brake means operative to secure the carriage as the file moves on its working stroke, and to free the carriage when the file is on its back stroke so as not to interfere with the traverse movement of the saw.

This brake mechanism comprises, as best seen in Figs. 2 and 3, a pair of brake shoes 40 one arranged over each roller 37 and so spaced thereabove as to ride the upper edge of the carriage rail 33. These brake shoes are substantially semi-circular in shape, made of fiber or similar material, and they are pivotally mounted by screws 41 in brake rockers 42. The shoes have their straight edges 43 disposed to engage the upper edge of rail 33 while their curved upper edges ride in arcuate recesses 44 formed in the rockers 42 so that the shoes will be self-aligning. In other words, they may rock about the screws 41 to keep their straight edges 43 in full length contact with the rail. Small cover plates 45 are secured by screws 46 to the rockers to hold the brake shoes in the recesses 44.

The brake rockers 42 are fulcrumed at 47 upon the face plate 16 in such manner that the ends of the rockers carrying the shoes may swing up and down with respect to the carriage rail. The rockers are U-shaped in plan view having bight portions 48 spaced outwardly from the lateral edges of the face plate 16, and front and rear inwardly turned ends 49—50 which project over the front and rear surfaces of the plate respectively, the front ends carrying the brake shoes as described. Expansion coil springs 51 are braced in pairs between the bight portions 48 and the edges of the face plate, below the level of the fulcrums 47, and thus normally bias the rockers in such direction as to yieldably urge the brake shoes against the upper edge of the carriage rail 33. Upper springs 52 are similarly positioned, but above the level of the fulcrums 47, and these springs as well as one spring of each lower pair 51, are provided with set screws 53 in the bights 48 so that the comparative tension of the springs may be adjusted, and the brake shoes 40 held on the carriage rail with the desired pressure.

The rear ends 50 of the brake rockers 42 (Fig. 3) angle downwardly toward each other and terminate in rearwardly turned apertured lugs 54 through which extends a rod 55, having a knurled knob 56 at one end, and a cranked offset or eccentric portion 57 between said lugs. Pins 55a projecting radially from the rod 55 hold it against endwise displacement from the lugs 54 and coasting with the cranked portion 57 of the rod is an operating finger 58 (Fig. 4) which is secured by spaced screws 59 to the side of the file carrier frame plate 26a. The finger 58 extends forwardly over the rod 55 and the forward end of the finger may be adjusted up and down with respect to the rod, by means of an arcuate slot 60 which receives the rear screw 59.

Bearing in mind the fact that the operation of the machine is conventionally such that the frame plate 26a moves down as the file travels on its working stroke across the saw, and moves up as the file returns on its back stroke, it will be apparent that the corresponding up and down movement of the finger 58 may be utilized to cause it to strike the actuating rod 55 on the down movement. This is true only when the cranked center portion 57 of the rod is turned upwardly as seen in Fig. 3. With the parts properly proportioned the downward pressure of the finger 58 upon the rod 55 will cause a corresponding downward movement of the brake rockers 42 at their ends which carry the brake shoes 40 and such movement will positively apply the shoes with clamping force to the saw carriage rail 33 to lock the carriage and saw against any displacement. It will be noted that this clamping braking effect is properly timed to apply it on the working stroke of the file, and as the file starts back the upward movement of the finger 58 will disengage the rod 55 and the upper springs 52 will then back off the brake shoe pressure so that only a frictional contact is present, allowing the saw carriage to traverse for the next operation.

When desired the knob 56 may be turned to swing the cranked center portion 57 of the rod 55 downward. Then the finger 58 will not contact the rod and the carriage is left free of the positive clamping action, as may be desirable when making adjustments and setting up the machine.

The pins 55a in addition to holding the rod 55 against removal from the lugs 54 also will contact the ends 50 of the brake rockers a little past dead center position of the cranked portion 57 so that the rod will not twist out of place as the finger 58 strikes.

The positive clamping action of the brake mechanism further enables me to sharpen small tapered saws such as a key-hole saw as seen at C in Figs. 5 and 6 by the use of a special carriage designated generally at 62. These saws cannot be clamped in the usual type of carriage nor held by the vise jaw 19, but the carriage 62 is provided with a single upper rail 63 and an offset plate 64 through which clamp screws 65 are extended at intervals along its length. An angle-iron clamp 66 is provided and apertured at the junction of its webs to pass the screws 65 as seen in Fig. 6. Tapped socket members 67 are then screwed on the front ends of the screws 65 and when turned tight the upper web of the angle iron will clamp the saw C against the upper edge of the plate 64 as shown. The socket members 67 have handles 68 for most convenient manipulation. When the saw C is thus mounted in the carriage 62 the vise jaw 19 and carriage 32 of the machine are removed and the rail 63 is run on the rollers 37. The saw may then be readily filed without the action of the vise, due in part to the comparative shortness of the saw but primarily to the positive manner in which the carriage is clamped by my brake mechanism on each working stroke of the file.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination in a saw filing machine of the character described including a main frame, a saw carriage traversably mounted on the frame, a reciprocating file carrier for moving a file on working and return strokes across a saw in the carriage, and a frame member supporting said file carrier and movable up and down to lower the file upon the saw during the working stroke and lifting the file from the saw on the return stroke, of a saw carriage brake mechanism comprising oscillatably supported brake rockers, brake shoes carried by said rockers, means yieldably biasing the rocker in one direction to frictionally apply the shoes to the saw carriage, and mechanism operative on the down movement of the said frame member to positively move the rockers in the same direction and apply the brake shoes with positive clamping action to the saw carriage to thereby hold it against traverse movement when the file is in contact with the saw.

2. The combination in a saw filing machine of the character described including a main frame, a saw carriage traversably mounted on the frame, a reciprocating file carrier for moving a file on working and return strokes across a saw in the carriage, and a frame member supporting said file carrier and movable up and down to lower the file upon the saw during the working stroke and lifting the file from the saw on the return stroke, of a saw carriage brake mechanism comprising oscillatably supported brake rockers, brake shoes carried by said rockers, means yieldably biasing the rockers in one direction to frictionally apply the shoes to the saw carriage, mechanism operative on the down movement of the said frame member to positively move the rockers in the same direction and apply the brake shoes with positive clamping action to the saw carriage to thereby hold it against traverse movement when the file is in contact with the saw, and means also yieldably biasing the brake rockers in the opposite direction to restore the shoes to only frictional engagement with the carriage after each such operation of said mechanism.

3. The combination in a saw filing machine of the character described including a main frame, a saw carriage traversably mounted on the frame, a reciprocating file carrier for moving a file on working and return strokes across a saw in the carriage, and a frame member supporting said file carrier and movable up and down to lower the file upon the saw during the working stroke and lifting the file from the saw on the return stroke, of a saw carriage brake mechanism comprising oscillatably supported brake rockers, brake shoes carried by said rockers, mechanism operative on the down movement of the said frame member to move the brake rockers in one direction and apply the brake shoes with clamping force to the saw carriage and thereby hold the saw against movement as the file moves on its working stroke, and the brake shoes being of semi-circular shape and pivotally mounted on the rockers to bring the straight edges of the shoes into self-aligning contact with the carriage.

4. The combination in a saw filing machine of the character described including a main frame, a saw carriage traversably mounted on the frame, a reciprocating file carrier for moving a file on working and return strokes across a saw in the carriage, and a frame member supporting said file carrier and movable up and down to lower the file upon the saw during the working stroke and lifting the file from the saw on the return stroke, of a saw carriage brake mechanism comprising oscillatably supported brake rockers, brake shoes carried by said rockers, mechanism operative on the down movement of the said frame member to move the brake rockers in one direction and apply the brake shoes with clamping force to the saw carriage and thereby hold the saw against movement as the file moves on its working stroke, the said rockers having arcuate sockets and the brake shoes being of substantially semi-circular shape pivoted in said sockets and arranged with their straight edges in contact with the saw carriage.

5. Saw carriage brake mechanism for the saw carriage of a saw filer having a frame on which said carriage is traversably mounted, a reciprocating file carrier for moving a file across a saw in the carriage and a frame member supporting the carrier and movable up and down to lower the file on its working stroke and lift it on its return stroke; the said brake mechanism comprising brake rockers oscillatably mounted on the frame, brake shoes of fiber or analogous material carried by the rockers, springs arranged to hold the shoes in light frictional contact with the carriage, an actuating rod connecting the rockers, and a finger on the said frame member operative as the frame member moves down to contact the actuating rod and rock the brake rockers in such direction as to apply the brake shoes with added clamping force against the saw carriage.

6. Saw carriage brake mechanism for the saw carriage of a saw filer having a frame on which said carriage is traversably mounted, a reciprocating file carrier for moving a file across a saw in the carriage and a frame member supporting the carrier and movable up and down to lower the file on its working stroke and lift it on its return stroke; the said brake mechanism comprising brake rockers oscillatably mounted on the frame, brake shoes of fiber or analogous material carried by the rockers, springs arranged to hold the shoes in light frictional contact with the carriage, an actuating rod connecting the rockers, and a finger on the said frame member operative as the frame member moves down to contact the actuating rod and rock the brake rockers in such direction as to apply the brake shoes with added clamping force against the saw carriage, the said actuating rod having an offset portion for such engagement by the finger and a knob by which the rod may be turned to swing said offset portion to a position at which the finger will clear.

7. Saw carriage brake mechanism for the saw carriage of a saw filer having a frame on which said carriage is traversably mounted, a reciprocating file carrier for moving a file across a saw in the carriage and a frame member supporting the carrier and movable up and down to lower the file on its working stroke and lift it on its return stroke; the said brake mechanism comprising brake rockers oscillatably mounted on the frame, brake shoes of fiber or analogous material carried by the rockers, springs arranged to hold the shoes in light frictional contact with the carriage, an actuating rod connecting the rockers, and a finger on the said frame member operative as the frame member moves down to contact the actuating rod and rock the brake rockers in such direction as to apply the brake shoes with added clamping force against the saw carriage, and the said finger being adjustably supported on the frame member for up and down adjustment with respect to the actuating rod.

8. The combination in a saw filing machine of the character described including a main frame, a saw carriage traversably mounted on the frame, a reciprocating file carrier for moving a file on working and return strokes across a saw in the carriage, and a frame member supporting said file carrier and movable up and down to lower the file upon the saw during the working stroke and lifting the file from the saw on the return stroke, of a saw carriage brake mechanism comprising oscillatably supported brake rockers, brake shoes carried by said rockers, mechanism operative on the down movement of the said frame member to move the brake rockers in one direction and apply the brake shoes with clamping force to the saw carriage and thereby hold the saw against movement as the file moves on its working stroke, the said brake shoes being of substantially semi-circular shape located with their straight edges in contact with the carriage, pivot means pivotally mounting the shoes on the rockers, the rockers having arcuate recesses engaging the curved edges of the shoes, and cover plates secured on the rockers over the recesses and depending beyond the straight edges of the brake shoes.

9. Saw carriage brake mechanism for the saw carriage of a saw filer having a frame on which said carriage is traversably mounted, a reciprocating file carrier for moving a file across a saw in the carriage and a frame member supporting the carrier and movable up and down to lower the file on its working stroke and lift it on its return stroke; the said brake mechanism comprising brake rockers oscillatably mounted on the frame, brake shoes of fiber or analogous material carried by the rockers, springs arranged to hold the shoes in light frictional contact with the carriage, the said rockers having apertured lugs, an actuating rod extending through the lugs and connecting the rockers, and a finger on the frame member operative as the frame member moves down to contact the actuating rod and swing the rockers in such direction as to clamp the brake shoes on the saw carriage.

10. Saw carriage brake mechanism for the saw carriage of a saw filer having a frame on which said carriage is traversably mounted, a reciprocating file carrier for moving a file across a saw in the carriage and a frame member supporting the carrier and movable up and down to lower the file on its working stroke and lift it on its return stroke; the said brake mechanism comprising U-shaped brake rockers having front and rear portions and connecting bight portions, means oscillatably mounting the rockers on the frame, brake shoes on the front portions of the rockers for engaging the saw carriage, an actuating rod connecting the rear portions of the rockers, and means on the said frame member for engaging the actuating rod as the frame member moves down to thereby swing the rockers in such direction as to apply the brake shoes with clamping force to the saw carriage.

11. Saw carriage brake mechanism for the saw carriage of a saw filer having a frame on which said carriage is traversably mounted, a reciprocating file carrier for moving a file across a saw in the carriage and a frame member supporting the carrier and movable up and down to lower the file on its working stroke and lift it on its return stroke; the said brake mechanism comprising U-shaped brake rockers having front and rear portions and connecting bight portions, means oscillatably mounting the rockers on the frame, brake shoes on the front portions of the rockers for engaging the saw carriage, an actuating rod connecting the rear portions of the rockers, and springs arranged between the bight portions of the rockers and the frame to normally apply the brake shoes with light frictional contact to the saw carriage.

CHARLES C. BORNHOLDT.

REFERENCES CITED

The following references are of record in the file of this patent:

UNITED STATES PATENTS

| Number | Name | Date |
| --- | --- | --- |
| 506,222 | Ginter et al. | Oct. 10, 1893 |
| 610,980 | Wallace et al. | Sept. 20, 1898 |
| 889,180 | Daniels | May 26, 1908 |
| 1,159,442 | Wasser | Nov. 9, 1915 |
| 1,994,332 | Boze | Mar. 12, 1935 |
| 2,343,171 | Collier | Feb. 29, 1944 |
| 2,432,420 | Hendrickson | Dec. 9, 1947 |